US009606340B2

(12) United States Patent
Hines et al.

(10) Patent No.: US 9,606,340 B2
(45) Date of Patent: Mar. 28, 2017

(54) COMPOUND OPTICAL PROXY FOR SENSING AND POINTING OF LIGHT SOURCES

(71) Applicant: SOLARRESERVE, LLC, Santa Monica, CA (US)

(72) Inventors: Braden E. Hines, Pasadena, CA (US); Terry J. Bailey, Monrovia, CA (US); Richard L. Johnson, Jr., Suffolk, VA (US)

(73) Assignee: SOLARRESERVE TECHNOLOGY, LLC., Santa Monica, CA (US)

( * ) Notice: Subject to any disclaimer, the term of this patent is extended or adjusted under 35 U.S.C. 154(b) by 0 days.

(21) Appl. No.: 14/374,058

(22) PCT Filed: Jan. 24, 2013

(86) PCT No.: PCT/US2013/022860
§ 371 (c)(1),
(2) Date: Jul. 23, 2014

(87) PCT Pub. No.: WO2013/112667
PCT Pub. Date: Aug. 1, 2013

(65) Prior Publication Data
US 2015/0241678 A1  Aug. 27, 2015

Related U.S. Application Data

(60) Provisional application No. 61/590,278, filed on Jan. 24, 2012, provisional application No. 61/666,827, filed on Jun. 30, 2012.

(51) Int. Cl.
*G01C 21/02* (2006.01)
*G02B 19/00* (2006.01)
(Continued)

(52) U.S. Cl.
CPC ............ *G02B 19/0042* (2013.01); *F24J 2/38* (2013.01); *G01J 1/42* (2013.01); *G01S 3/7861* (2013.01);
(Continued)

(58) Field of Classification Search
CPC ......... F24J 2/38; G01S 3/7861; G01S 3/7803; Y02E 10/41; Y02E 10/47
See application file for complete search history.

(56) References Cited

U.S. PATENT DOCUMENTS 4,519,382 A    5/1985   Gerwin
4,874,937 A   10/1989   Okamoto
(Continued)

FOREIGN PATENT DOCUMENTS

CN         1353819         6/2012
DE    10 2009 037280 A1    4/2011
(Continued)

OTHER PUBLICATIONS

How it Works, Helistat, "Hands Down the Cheapest Way to Gather the Suns Energy", http://www.heliostatus/howitworks.htm, pp. 1-4. (no date).
(Continued)

*Primary Examiner* — Thanh Luu
(74) *Attorney, Agent, or Firm* — Kagan Binder, PLLC

(57) ABSTRACT

The present invention relates to apparatus and methods to provide a closed loop pointing system for the purpose of redirecting light from a source onto a target. In one aspect the present invention relates to a method of redirecting incident light, comprising the steps of: using at least one light redirecting element to redirect the incident light; providing a plurality of optical proxies that are associated with the reflecting element in a manner such that at least two of the optical proxies distribute a portion of the incident light
(Continued)

uniquely relative to each other, wherein optical information encoded in the light distributed by the optical proxies cumulatively correlates to the aim of the light redirecting element; observing the optical information distributed by the optical proxies; and using the optical information to controllably actuate the light redirecting element in a manner that aims the redirected light onto a target.

38 Claims, 13 Drawing Sheets

(51) Int. Cl.
- *F24J 2/38* (2014.01)
- *G01S 3/786* (2006.01)
- *G01J 1/42* (2006.01)
- *G01S 17/66* (2006.01)
- *G02B 27/09* (2006.01)
- *F24J 2/16* (2006.01)
- *G02B 5/02* (2006.01)

(52) U.S. Cl.
CPC .......... *G01S 17/66* (2013.01); *G02B 19/0019* (2013.01); *G02B 19/0076* (2013.01); *G02B 27/0927* (2013.01); *F24J 2/16* (2013.01); *G02B 5/02* (2013.01); *Y02E 10/47* (2013.01)

(56) References Cited

U.S. PATENT DOCUMENTS

| | | | |
|---|---|---|---|
| 4,998,823 | A | 3/1991 | Kitajima |
| 5,282,016 | A | 1/1994 | Shen et al. |
| 5,670,774 | A | 9/1997 | Hill |
| 5,862,799 | A | 1/1999 | Yogev et al. |
| 6,174,648 | B1 | 1/2001 | Terao et al. |
| 6,923,174 | B1 | 8/2005 | Kurz |
| 9,010,317 | B1 * | 4/2015 | Gross ................ F24J 2/36 126/573 |
| 9,157,656 | B2 | 10/2015 | Saeck et al. |
| 2004/0031483 | A1 | 2/2004 | Kinoshita |
| 2005/0274376 | A1 | 12/2005 | Litwin et al. |
| 2006/0098566 | A1 | 5/2006 | Christian et al. |
| 2006/0163446 | A1 | 7/2006 | Guyer et al. |
| 2006/0260605 | A1 | 11/2006 | Connor |
| 2007/0268585 | A1 | 11/2007 | Santoro et al. |
| 2009/0052910 | A1 | 2/2009 | Schemmann et al. |
| 2009/0107485 | A1 | 4/2009 | Reznik et al. |
| 2009/0179139 | A1 | 7/2009 | Hines et al. |
| 2009/0249787 | A1 | 10/2009 | Pfahl et al. |
| 2010/0252024 | A1 | 10/2010 | Convery |
| 2010/0263709 | A1 | 10/2010 | Norman et al. |
| 2011/0120448 | A1 | 5/2011 | Fitch et al. |
| 2011/0155119 | A1 | 6/2011 | Hickerson et al. |
| 2011/0216535 | A1 | 9/2011 | McEntee |
| 2011/0265783 | A1 | 11/2011 | Yatir |
| 2011/0317876 | A1 | 12/2011 | Bender |
| 2012/0132194 | A1 | 5/2012 | Saeck et al. |
| 2012/0145143 | A1 | 6/2012 | Hoffschmidt et al. |
| 2012/0174909 | A1 | 7/2012 | Koningstein et al. |

FOREIGN PATENT DOCUMENTS

| | | |
|---|---|---|
| WO | 2009/055624 A1 | 4/2009 |
| WO | WO 2009/055624 A1 | 4/2009 |
| WO | 2010/101468 | 9/2010 |
| WO | 2011/018367 | 2/2011 |
| WO | 2012/25751 | 9/2012 |
| WO | 2012/125748 | 9/2012 |
| WO | WO 2012/125748 | 9/2012 |
| WO | WO 2012/125751 | 9/2012 |

OTHER PUBLICATIONS

European Patent Application No. 13741310.0; Extended Search Report issued Oct. 26, 2015.

Sargent & Lundy LLC Consulting Group, "Assessment of Parabolic Trough and Power Tower Solar Technology Cost and Performance Forecasts," Oct. 2003, 344 pages.

How it Works, Helistat "Hands Down the Cheapest Way to Gather the Suns Energy," http://www.heliostat.us/howitworks.htm, pp. 1-3 (no date.

* cited by examiner

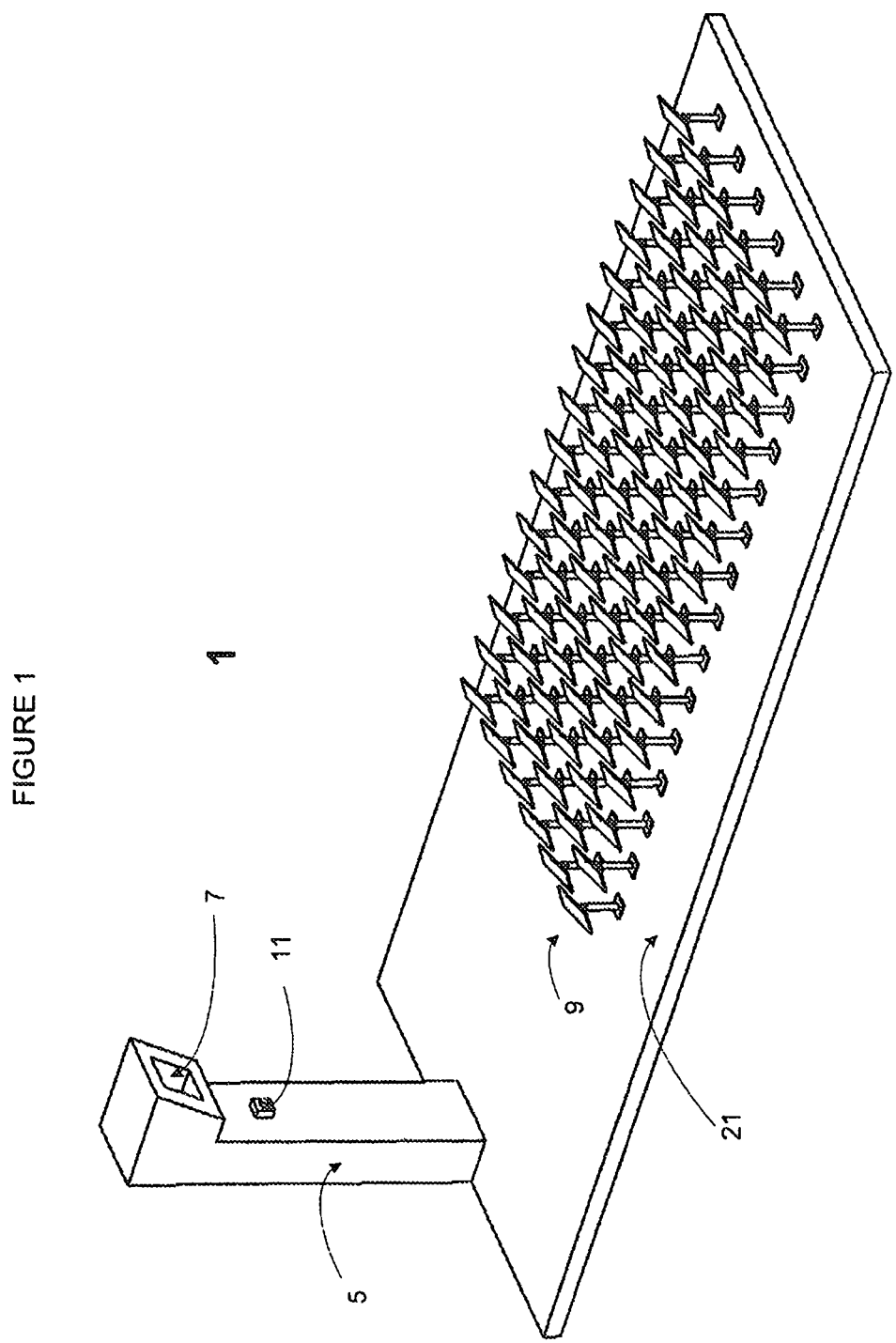

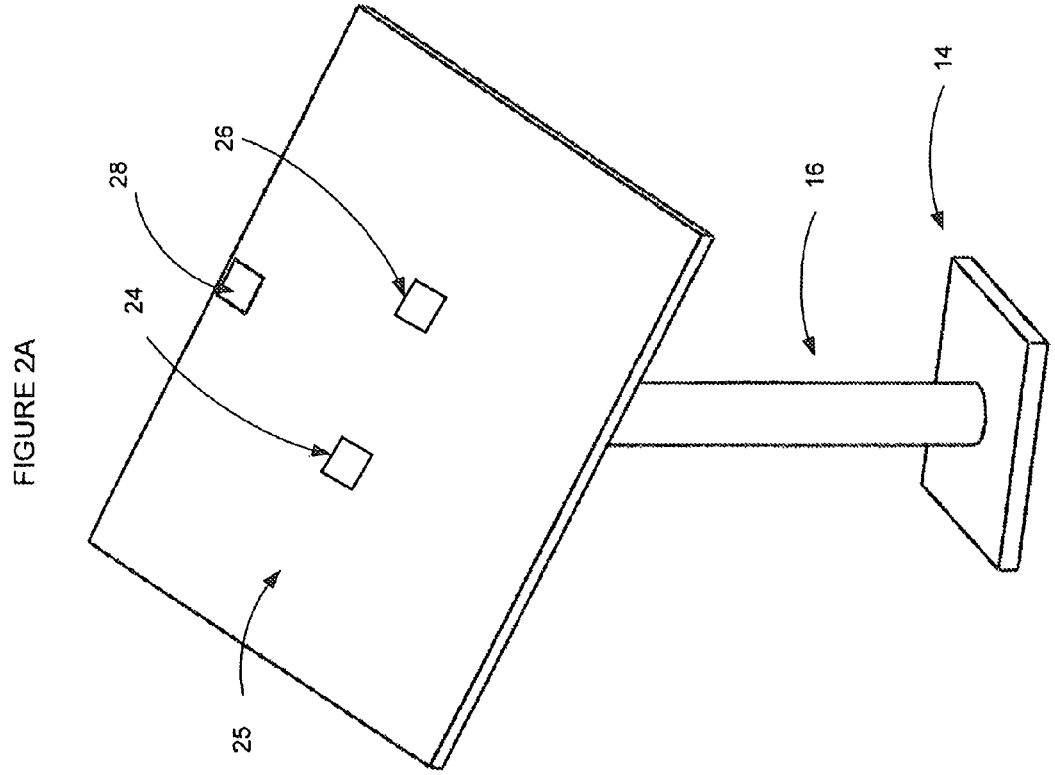

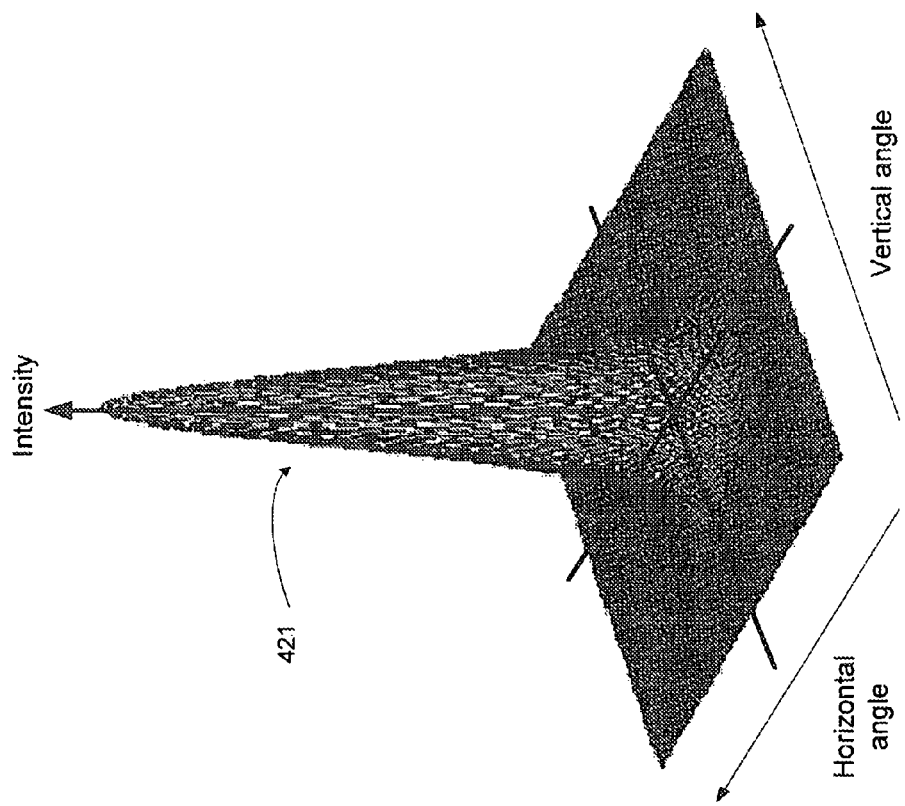

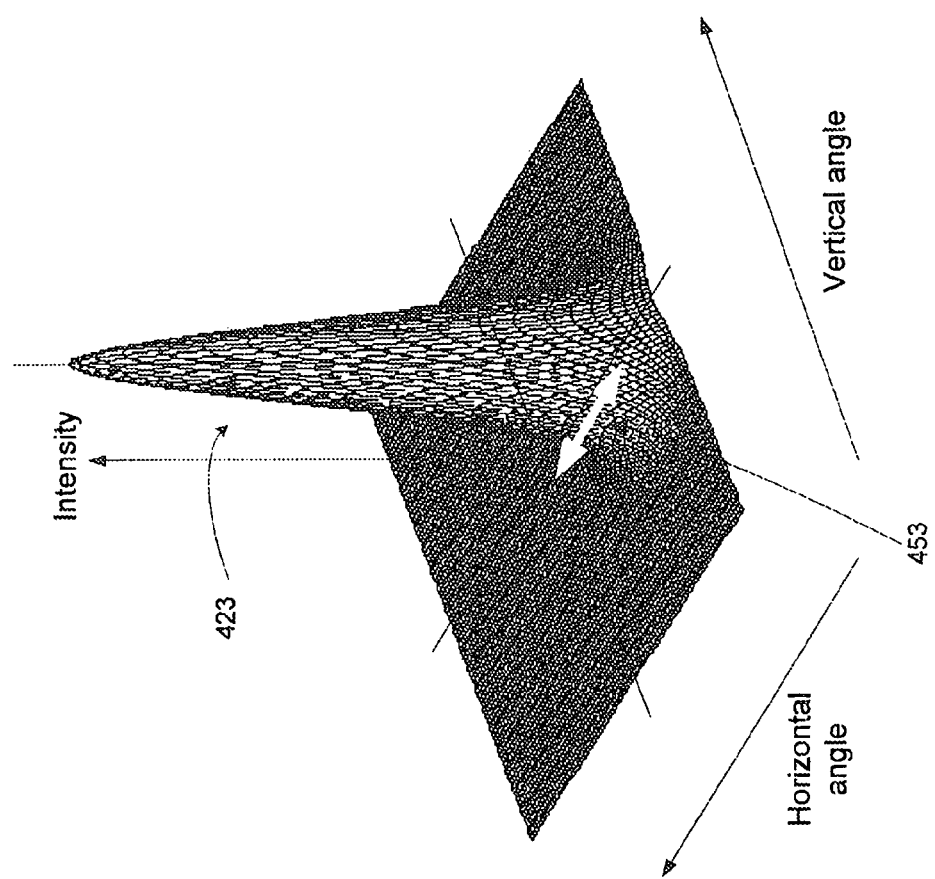

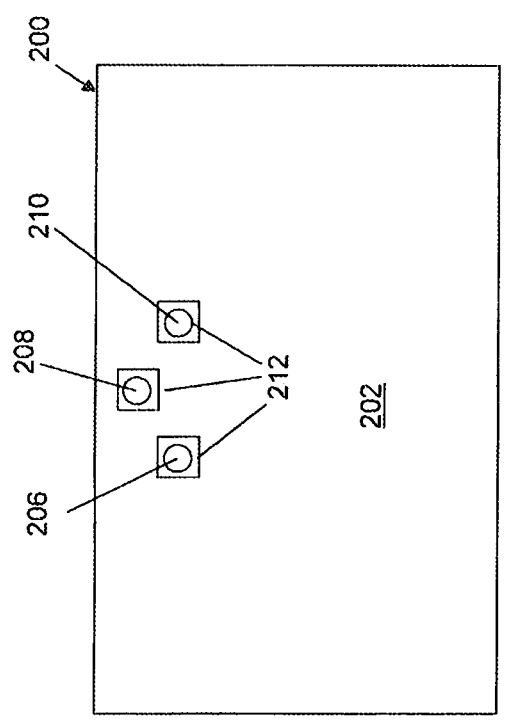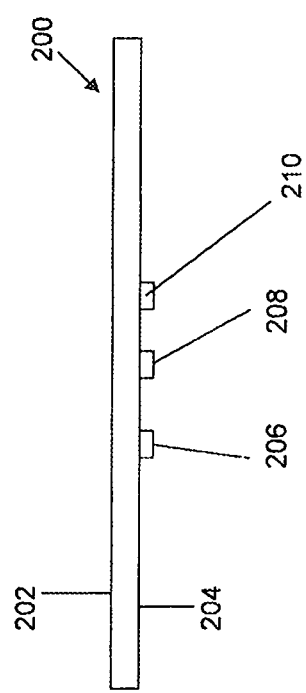

COMPOUND OPTICAL PROXY FOR SENSING AND POINTING OF LIGHT SOURCES

PRIORITY

This application claims priority to International Application No. PCT/US2013/022860, filed on Jan. 24, 2013, which in turn claims priority under 35 U.S.C. §119(e) to U.S. provisional application No. 61/590,278, titled "COMPOUND OPTICAL PROXY FOR SENSING AND POINTING OF LIGHT SOURCES", filed Jan. 24, 2012, and U.S. provisional application No. 61/666,827, titled "POSITION-ENCODED OPTICAL PROXY FOR SENSING AND POINTING OF LIGHT SOURCES", filed Jun. 30, 2012, wherein the of these applications are incorporated herein by reference in their entireties for all purposes, respectively.

FIELD OF THE INVENTION

The present invention relates generally to the field of lighting control systems, and in particular to apparatus and methods to help control redirection of light from one or more sources onto one or more desired targets. Of specific interest is the application to heliostats in the field of concentrating solar power (CSP) or concentrating photovoltaics (CPV).

BACKGROUND OF THE INVENTION

The use of heliostats in the fields of concentrating solar power and concentrating photovoltaics is well established in the prior art. A typical CSP or central tower CPV system includes a centralized tower and a plurality of suitably mounted heliostats that are pointed so that the reflected sunlight impinges on the central tower focal point which often is fixed in space relative to the heliostat. For such conditions to be realized, the laws of reflection require that the angle formed between the sunlight vector and the mirror normal must be equal to the angle formed between the properly aimed redirected ray of light and the mirror normal. All three vectors also must lie in the same plane. It can be shown using vector algebra that for a given a sunlight vector and a properly aimed reflected light ray, there is a unique solution for the mirror normal that is simply the normalized average of the incident and reflected light vectors.

The centralized tower serves as the focal point onto which individual heliostats redirect sunlight. The aim of the heliostats can be controllably adjusted as the sun moves in the sky to redirect incident sunlight onto the centralized tower. The concentration of sunlight at the tower focus is therefore correlated to the number of heliostats up to certain fundamental limits. The high concentration of solar energy is converted by the tower into other useful forms, such as heat which can then be used either directly or be used to generate steam to power electrical generators, or directly to electricity through the use of any number of photovoltaic devices generally referred to as solar cells.

Heliostats generally include a mirror to redirect sunlight, support structure to hold the mirror and to allow the mirror to be articulated, and actuators such as motors to effect the articulation. At a minimum, heliostats usually provide at least two degrees of rotational freedom in order to redirect sunlight onto a fixed tower focus area. Heliostat mirrors are often planar, but may also have more complex shapes.

Heliostat articulation can follow an azimuth/elevation scheme by which the mirror rotates about an axis perpendicular to the earth surface for the azimuth and then rotates about an elevation axis that is parallel to the earth surface. The elevation axis often is coupled to the azimuth rotation such that the direction of the elevation is a function of the azimuth angle. Alternatively, heliostats can articulate using a tip/tilt scheme in which the mirror rotates about a fixed tilt axis that is parallel to the earth surface. The tip axis is orthogonal to the tilt axis but its direction rotates as a function of the tilt axis. The tip axis is parallel to the earth surface when the heliostat mirror normal vector is parallel to the normal of the earth surface. Other schemes, such as polar tracking and many others, are also possible; the present invention is applicable to any of these schemes.

Many heliostat control systems employ open loop algorithms based on system geometry and sun position calculators in order to determine the sun and heliostat-to-focus vectors as a function of time. These calculations result in azimuth/elevation or tip/tilt commands to each heliostat device. Such control systems generally assume that the location of the heliostats are static and well defined, or otherwise rely on periodic calibration maintenance to correct for settling and other lifetime induced drifts and offsets. Open loop solutions are, advantageous in that they don't require any specialized feedback sensors to detect how well each heliostat is pointed. These systems simply tell every heliostat how to point and assume that the heliostats point correctly.

Closed loop heliostat pointing, on the other hand, relies primarily on feedback from one or more sensors capable of measuring differences between the desired heliostat-to-focus vector and the actual reflected sunlight vector. These errors are then processed into compensation signals that are provided to the heliostat actuators to articulate the mirror so that reflected sunlight impinges on the tower focus. Closed loop pointing has an advantage that it does not require precise installation or knowledge of the system geometry and can be made less sensitive to lifetime drifts. The elimination of the precision installation normally associated with open loop systems is a noteworthy advantage of closed loop pointing.

A difficulty in applying closed loop pointing methods on CSP systems results from the pointing condition requiring the bisection of two vectors rather than alignment to a single vector. That is, during normal operation, a heliostat mirror itself doesn't point at anything in particular. Rather, it must point in a direction between the sun and the target, and the point moves with time as the sun moves. Nominally, there is nothing in that direction but empty sky, so there is nothing for a traditional closed loop tracking system to point the mirror at.

The ideal closed loop heliostat tracking system could directly sense the difference between the actual reflected sunlight vector and the vector corresponding to a properly aimed reflected light vector, and then endeavor to control that difference to zero. Other schemes are possible, albeit less desirable.

For example, one prior art system (http://www.heliostat.us/howitworks.htm) discloses a sensor that controls the sunlight vector to be aligned with a third vector, which is the axis of a sensor near the heliostat. During installation of the system, the sensor is aligned with the line of sight vector to the target. The, accuracy of the system is thus dependent on the accuracy of this alignment and on the alignment remaining unchanged. In large CSP systems, however, this may be insufficient for several reasons. For example, the tower may sway in the wind or experience thermal expansion or contraction. Components can wear or shift. Cost may also be an issue, since each heliostat requires a separate sensor.

A second type of "closed loop" heliostat system that is common in the prior art is a system that senses the orientation of the heliostat axes with respect to the heliostat base. The control system then provides corrections to any detected errors in the orientation of these axes. This type of system mitigates errors in the gear train of the heliostat or errors, but it does not sense the sunlight vector at all. Consequently, this approach is susceptible to unseen errors in this vector, and it is blind to any errors in the alignment of the sunlight vector to the line of sight to the target. This system thus likewise may be sensitive to motions of the tower and long-term drifts. Practical systems tend to include elaborate calibration schemes to deal with these issues. Cost also is impacted, since encoders are needed for each axis of each heliostat.

As an alternative, a closed loop system more desirably would observe and track the reflected sunlight beam directly. An obvious location for a feedback sensor would be at the tower focus, since this is where the reflected beam is targeted. Generally, this is not practical for systems that concentrate substantial sunlight, because no practical sensor could withstand the extreme temperatures or the ultraviolet radiation that is present at the focus. Nonetheless, it is desirable to control the difference between the reflected sunlight beam and line of sight corresponding to a reflected beam that is properly aimed. Consequently less direct methods of providing feedback would be desired to make closed loop pointing feasible.

The use of optical proxies is an innovative approach that makes it feasible to use closed loop pointing. Using optical proxies to help control the aim of heliostats is described in U.S. provisional applications No. 61/562,962, entitled "Optical Proxy for Sensing and Pointing of Light Sources", filed Nov. 22, 2011 and No. 61/465,165, entitled "Apparatus and Method for Pointing Light Sources," filed Mar. 14, 2011, WO 2012/125748A2, WO 2012/125751A2, and these applications and publications are incorporated here in their respective entireties by reference for all purposes.

The aforementioned applications introduced the use of one or more optical proxies, such as diffractive or diffusive elements, having optical characteristics that correlate to the aim of the heliostat and therefore also correlate to the actual vector of the primary light beam reflected from a heliostat. Optical characteristics of the proxies, not the reflected light beam, are sensed using a plurality of imaging sensors to allow indirect sensing of the actual aim of the reflected light beam. If the actual aim deviates from the desired aim, the aim is corrected. Multiple imaging sensors viewed one or more of the optical proxies from different perspectives in a manner such that the optical characteristics of the one or more proxies varied from perspective to perspective. In a manner analogous to the way multiple variables can be solved using multiple equations, the plurality of unique perspectives of sensed information allowed the vector of the reflected light to be accurately determined even though the at least one proxy, not the reflected light, was being sensed. This advantageously permitted closed-loop control of the aim of the reflected light beam. This technique is especially useful in the fields of concentrating solar power (CSP) or central tower concentrating photovoltaics (CPV) for controlling heliostats.

Numerous techniques are possible for using information from optical proxies to determine the aim of the redirected light beam. The aforementioned applications detailed one of these techniques that involved using multiple imaging sensors to observe the one or more proxies from multiple perspectives so that the vector of the reflected light could be uniquely determined. An approach that permits the use of a smaller number of perspectives, including as few as one perspective, would also be desired.

SUMMARY OF THE INVENTION

The present invention relates to apparatus and methods to provide a closed loop pointing system for the purpose of redirecting light from a source onto a target. Whereas the application of the invention disclosed herein is presented in the context of concentrating solar power, the apparatus and methods are generally applicable to any pointing system in which light is redirected onto one or more targets including targets that are not stationary. Also, whereas the application of the invention disclosed herein is presented in the context of closed loop pointing systems, the apparatus and methods are generally applicable to any system which must sense the aim of a redirected light beam, whether or not it attempts to control said aim.

In preferred embodiments, the present invention makes use of multiple optical proxies working together as a single compound optical proxy, to permit the use of fewer imaging sensors and/or fewer observations of the optical proxies. The nature of a compound proxy is that the aim of the heliostat may be determined using only a single observation of each proxy element if desired, as compared to approaches that require multiple observations of the same element from multiple perspectives in order to derive sufficient optical information for aiming and controlling light redirection. Some embodiments may include as few as one imaging sensor that has a field of view that encompasses all the proxy elements associated with light redirecting element(s) being observed. The control system is then able to fully determine the aim of a redirected light beam from the optical information captured from a single observation of the proxy elements.

Optical proxies used in the practice of the present invention may have a variety of optical characteristics. For example, optical proxies used in the practice of the present invention may have intensity profiles that are radially symmetric. In other embodiments, the proxies may have any arbitrary function of intensity. Likewise, an optical proxy may encode angular tilts as changes in wavelength (as in the case of a diffractive element) or any other optical parameter, and may comprise any arbitrary function of the parameter of interest. The present invention teaches that one particularly useful optical proxy function is one that varies substantially in one direction while having little variation in the other direction. It further teaches that there is a class of functions whose angular sensitivity is largely independent of distance to the imaging sensor, and that this is a desirable property in many embodiments. It further teaches that a plurality of optical proxies may be provided with different angular responses, for example, to help provide both coarse and fine sensing capability.

Optical proxies may be associated with light redirecting elements in a variety of different ways. In some embodiments such as where the light redirector is a mirror, this may comprise a technique of providing a window in the light redirecting element (e.g., an area where there is no mirror coating) and allowing the optical proxy to be placed on the back side of the light redirecting element or otherwise behind the front side of the light redirecting element. Proxies positioned in this manner may be better protected, for example, from damage or from activities such as cleaning of the front side of the mirror.

In one aspect, the present invention relates to a method of sensing the aim of redirected, incident light, comprising the steps of:
- (a) using a light redirecting element to redirect the incident light;
- (b) providing a plurality of optical proxies that are associated with the redirecting element in a manner such that at least two of the optical proxies distribute a portion of the incident light uniquely relative to each other, wherein optical information encoded in the light distributed by the optical proxies cumulatively correlates to the aim of the light redirecting element;
- (c) observing the optical information distributed by the optical proxies; and
- (d) using the optical information to determine the aim of the light redirected by the light redirecting element.

In another aspect, the present invention relates to a method of redirecting incident light, comprising the steps of:
- (a) using at least one light redirecting element to redirect the incident light;
- (b) providing a plurality of optical proxies that are associated with the reflecting element in a manner such that at least two of the optical proxies distribute a portion of the incident light uniquely relative to each other, wherein optical information encoded in the light distributed by the optical proxies cumulatively correlates to the aim of the light redirecting element;
- (c) observing the optical information distributed by the optical proxies; and
- (d) using the optical information to controllably actuate the light redirecting element in a manner that aims the redirected light onto a target.

In another aspect, the present invention relates to a system for concentrating sunlight onto a centralized target, comprising:
- (a) a centralized target;
- (b) a plurality of heliostats, each heliostat comprising:
  - i) a light redirecting element that redirects incident sunlight; and
  - ii) a plurality of optical proxies that are associated with the light redirecting element in a manner such that at least two of the optical proxies distribute a portion of the incident light uniquely relative to each other, wherein optical information encoded in the light distributed by the optical proxies cumulatively correlates to the aim of the light redirecting element;
- (c) a device that observes the optical information distributed by the optical proxies; and
- (d) optionally a control system that uses the optical information in a manner effective to aim the redirected sunlight onto the centralized target.

In another aspect, the present invention relates to a system for concentrating sunlight onto a centralized target, comprising:
- (a) a centralized target;
- (b) a plurality of heliostats, each heliostat comprising:
  - i) a light redirecting element that redirects incident sunlight, said element having a front side from which incident light is redirected and a backside; and
  - ii) a plurality of optical proxies mounted to the light redirecting element in a manner such that the optical proxies are viewable through at least one window incorporated in the light redirecting element, each of said optical proxies distributing a portion of the incident light in a manner that correlates to the aim of the light redirecting element;
- (c) a device that observes the optical proxies; and
- (d) optionally a control system that uses optical information obtained by observing the optical proxies in a manner effective to aim the redirected sunlight onto the centralized target.

In another aspect, the present invention relates to a method of sensing the aim of redirected, incident light, comprising the steps of:
- (a) using a light redirecting element to redirect the incident light;
- (b) providing a compound optical proxy comprising a plurality of optical proxies that are associated with the redirecting element in a manner such that at least two of the optical proxies distribute a portion of the incident light uniquely relative to each other as observed in a single observation of each unique optical proxy, wherein optical information encoded in the light distributed by the optical proxies cumulatively correlates to the aim of the light redirecting element;
- (c) observing the compound optical proxy in a single observation to sense optical information of the compound optical proxy; and
- (d) using the optical information to determine the aim of the light redirected by the light redirecting element.

In another aspect, the present invention relates to a method of redirecting incident light, comprising the steps of:
- (a) using at least one light redirecting element to redirect the incident light;
- (b) providing a compound optical proxy comprising a plurality of optical proxies that are associated with the reflecting element in a manner such that at least two of the optical proxies distribute a portion of the incident light uniquely relative to each other as observed in a single observation of each unique optical proxy, wherein optical information encoded in the light distributed by the optical proxies cumulatively correlates to the aim of the light redirecting element;
- (c) observing the compound optical proxy in a single observation to sense optical information of the compound optical proxy; and
- (d) using the optical information to controllably actuate the light redirecting element in a manner that aims the redirected light onto a target.

In another aspect, the present invention relates to a system for concentrating sunlight onto a centralized target, comprising:
- (a) a centralized target;
- (b) a plurality of heliostats, each heliostat comprising:
  - i) a light redirecting element that redirects incident sunlight; and
  - ii) a plurality of optical proxies that are associated with the light redirecting element in a manner such that at least two of the optical proxies distribute a portion of the incident light uniquely relative to each other as observed in a single observation of each unique optical proxy, wherein optical information encoded in the light distributed by the optical proxies cumulatively correlates to the aim of the light redirecting element;
- (c) a device that observes the optical proxies in a single observation to sense optical information of the compound optical proxy; and
- (d) optionally a control system that uses the optical information in a manner effective to aim the redirected sunlight onto the centralized target.

In another aspect, the present invention relates to a system for concentrating sunlight onto a centralized target, comprising:

(a) a centralized target;
(b) a plurality of heliostats, each heliostat comprising:
   i) a light redirecting element that redirects incident sunlight, said element having a front side from which incident light is redirected and a backside; and
   ii) a plurality of optical proxies mounted to the light redirecting element in a manner such that the optical proxies are viewable through at least one window incorporated in the light redirecting element, each of said optical proxies distributing a portion of the incident light in a manner that correlates to the aim of the light redirecting element;
(c) a device that observes the optical proxies in a single observation to sense optical information of the optical proxies; and
(d) optionally a control system that uses the optical information in a manner effective to aim the redirected sunlight onto the centralized target.

BRIEF DESCRIPTION OF THE DRAWINGS

FIG. 1 is a schematic perspective view of an exemplary concentrating solar power system of the present invention.

FIG. 2A is a schematic perspective view of a light redirecting element in the form of a heliostat used in the system of FIG. 1, wherein the heliostat incorporates an exemplary compound optical proxy of the present invention.

FIG. 5 is a representative symmetric intensity profile of one of the optical proxy elements of FIG. 4, which includes a diffuser mounted on a wedge, as a function of viewing angle with respect to its corresponding chief proxy ray, disregarding the effect of the mounting wedge.

FIG. 6 is a representative symmetric intensity profile of an optical proxy element of FIG. 4 as a function of viewing angle with respect to the chief reflected ray of the reflector taking into account the effect of the wedge on which the diffuser is mounted.

FIG. 12A shows a top view of a light redirecting element in which optical proxy elements are mounted to the backside of the element but are viewable from the front face through one or more windows.

FIG. 12B shows a side view of the light redirecting element of FIG. 12A.

DETAILED DESCRIPTION OF THE PREFERRED EMBODIMENTS

The apparatus and methods presented herein describe a closed-loop tracking system that utilizes the light distribution properties of a plurality of optical proxies, especially a plurality of optical proxies organized into one or more compound optical proxies, in order to sense orientation and effect articulation of a plurality of light redirecting elements in a preferred manner. Embodiments described herein are exemplary and do not represent all possible embodiments of the principles taught by the present invention. In particular, embodiments of the present invention have direct application in the field of concentrating solar power, particularly concentrating solar power including the use of heliostats to redirect sunlight onto a fixed focus in which concentrated sunlight may be converted into other forms of energy such as heat or electrical energy. Nevertheless, the apparatus and methods described herein can be applied and adapted by those skilled in the art for use in alternative applications in which light from a source is redirected onto one or more targets, particularly light from a source that is not stationary.

Figure 2B:
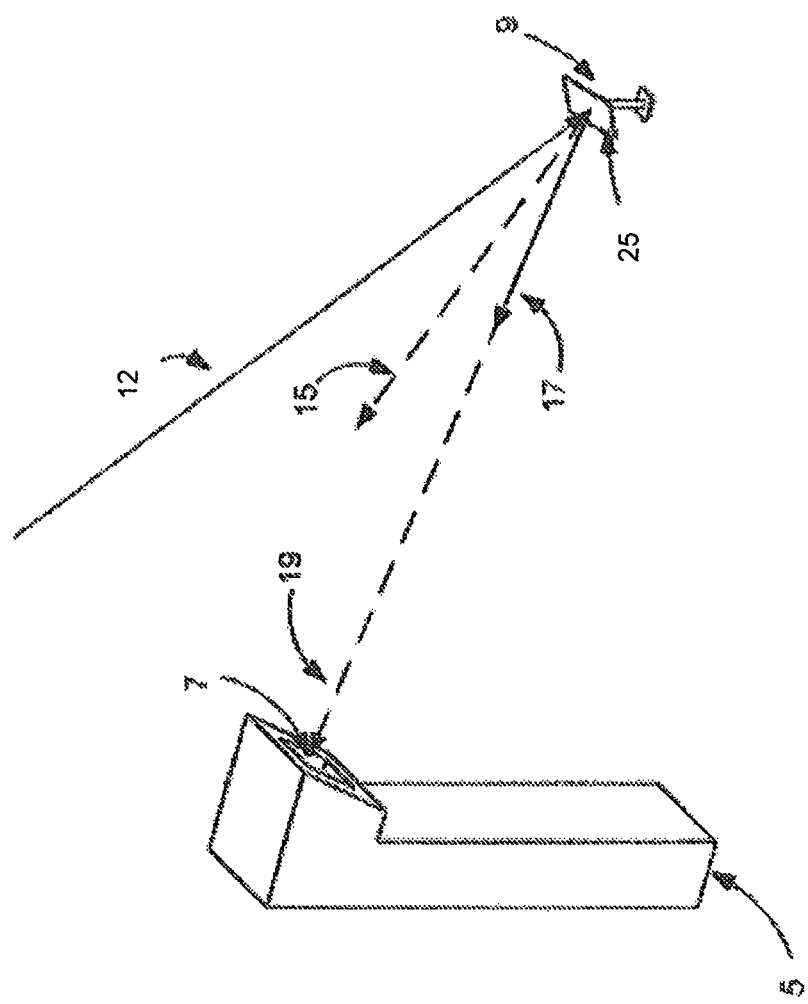
FIG. 2B shows how an exemplary light redirecting element of the system of FIG. 1 reflects an incident light ray onto a desired focused area of a central tower.
Figure 3:
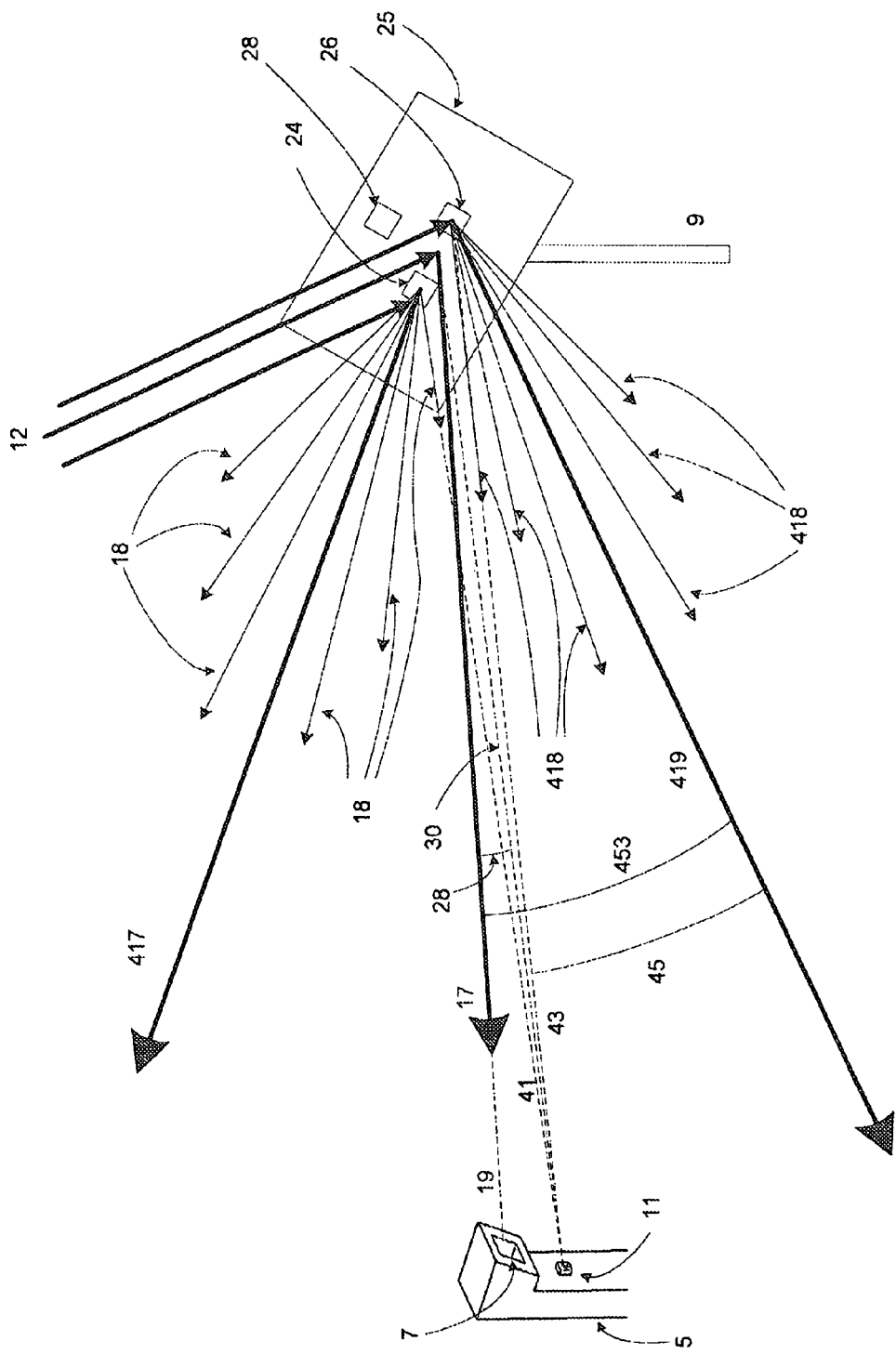
FIG. 3 is a view of a light redirecting element used in the system of FIG. 1, showing three elements of a compound optical proxy attached to the element and showing how light diffuses from two of the elements of the compound optical proxy and how light is reflected from the element.

Referring to FIGS. 1-3, a concentrating solar power system 1 is shown that incorporates closed loop sun tracking functionality. System 1 generally includes a central tower 5 including a focus area 7 and an associated imaging subsystem 11. System 1 also includes an array of light redirecting elements in the form of heliostats 9. For purposes of illustration, each heliostat 9 is coupled to mounting surface 21 via base 14 and post 16, but the heliostats 9 may be deployed in any suitable manner. Each heliostat 9 includes a reflecting element 25 that can be articulated. The direction of light reflected from each heliostat 9 correlates to how the corresponding element 25 is articulated. Preferably, the elements 25 are independently articulated so that the heliostats 9 redirect and concentrate incident sunlight onto focus area 7 of central tower 5. Reflecting elements 25 articulate to track movement of the sun so that redirected light can be aimed at focus area 7 as the sun moves.

Each heliostat 9 has a plurality of optical proxies 24, 26, and 28 coupled to reflecting element 25. The optical proxies 24, 26, and 28 on each heliostat 9 preferably are integrated into one or more compound optical proxies. A compound optical proxy is a plurality of optical proxy elements associated with a particular reflecting element 25, wherein each proxy element in a single observation of the optical proxy is able to generate optical information that correlates to the aim of the reflecting element 25 (and hence the direction of light reflected from the reflecting element 25) in a way that is unique relative to at least one of the other associated proxies, and wherein the cumulative optical information obtained from a single observation of the proxies allows the aim of light reflected from the reflector to be determined and/or controllably aimed at a desired target. The present invention teaches that within this plurality of optical proxies, each may provide an independent optical function so that each produces different optical information to be observed by imaging subsystem 11.

For example, each element 24, 26, and 28 provides unique intensity information that is a function of the aim of element 25. In this manner, the cumulative optical information provided by the plurality of optical proxies 24, 26, and 28 allows the aim of chief reflected light ray 17 to be precisely determined from the optical information captured by a single observation of each optical proxy element by an imaging subsystem 11. In some embodiments, a single observation may be made of each optical proxy. In other embodiments, a single observation may be made of two or more of the optical proxies collectively. This capability is described further below. The key teaching of the present invention is the use of a compound optical proxy by making a single observation of each individual proxy element. If the substantially the same observation is made multiple times, that is a single observation for purposes of the present invention. This is in contrast to a circumstance in which a single proxy element is viewed from multiple different perspectives in order to develop sufficient optical information from that proxy element in order to control the aim of the associated light redirecting element.

A feature of the present invention is that the use of optical proxies with unique optical responses allows but does not mandate observing each individual proxy only once from a single perspective. Even though a single observation of the optical proxies of a compound optical proxy allows the aim of reflecting element 25 to be determined and controlled, one skilled in the art will appreciate that other modes of practicing the present invention may involve use of multiple imaging subsystems that observe one or more optical proxies of a compound proxy from multiple perspectives. This may be advantageous, for example, in systems which desire to provide redundant imaging systems for enhanced system reliability.

By way of example, in the embodiment shown, each heliostat 9 includes a compound optical proxy comprising three optical diffusers 24, 26, and 28 mechanically coupled to reflective element 25. In other embodiments, compound optical proxies may be constituted by a greater or lesser number of optical proxy elements, e.g., two or four optical elements. Articulation of reflecting element 25 also causes optical proxies 24, 26, and 28 to articulate as well. The optical information sensed by imaging subsystem 11 correlates to the manner in which element 25 is articulated. This correlation allows the aim of the sunlight reflected by the element (as indicated by chief reflected ray 17) to be determined and controlled.

Imaging subsystem 11 is mounted to central tower 5 proximal to the system focus area, but preferably far enough from the system focus area so that light reflected by the main mirror surface of reflector element 25 does not normally impinge upon the imaging subsystem when properly aimed. Imaging subsystem 11 may be coupled to any convenient mechanical mounting point. In some embodiments, a separate tower or other mount (not shown) may be provided on which imaging subsystem 11 would be mounted. Imaging subsystem 11 observes optical proxies 24, 26, and 28. A closed loop tracking control system (not shown) processes the detected information in a manner to effect articulation of elements 25 in a desired manner so that incident light is redirected and concentrated onto focus area 7. Generally, solar power system 1 comprises one or more computational devices (not shown) coupled electronically to imaging subsystem 11 and heliostats 9 and comprising software to process information acquired by imaging subsystem 11 in order to effect articulation of the plurality of heliostats 9 for the purpose of redirecting sunlight onto the system focus 7.

As an overview of the functionality of this control system, optical information produced by the optical proxies 24, 26, and 28 is sensed by imaging subsystem 11. The sensed optical information correlates to the manner in which reflecting elements 25 are aimed, as described further below. Hence, the optical information indicates whether elements 25 are properly aimed to redirect light onto focus area 7. The control system thus determines if the aim is proper and corrects the aim as needed.

FIG. 2B shows how incident light ray 12 impinges upon an exemplary heliostat 9 of system 1 and is reflected as reflected light ray 17 along path 19 onto focus area 7 of central tower 5. In order for reflecting element 25 to properly aim ray 17 along path 19, the vector 15 normal to the surface of element 25 is aimed in a manner such that it bisects the angle between ray 12 and path 19. Optical information provided by proxies 24, 26 and 28 allows the aim to be measured and controlled.

FIG. 3 shows how optical proxies 24, 26, and 28 generate optical information that corresponds to the manner in which chief reflected light ray 17 is aimed. Element 25 reflects incident ray 12 as the chief reflected ray 17. Principles of the present invention are practiced using optical information produced by optical proxies 24, 26, and 28 to determine if reflected ray 17 is properly aimed along path 19 onto focus area 7.

In other words, the goal of the imaging subsystem 11 is to use measurements from the optical proxies 24, 26, and 28 to infer the direction of chief reflected ray 17. The imaging subsystem 11 does this by estimating the angle 28 between the line of sight 30 to the imaging subsystem 11 and the chief reflected ray 17.

In one embodiment, optical proxies 24, 26, and 28 are optical diffusers. In this embodiment, FIG. 3 illustrates how optical diffusers 24 and 26 generate diffused rays 18 and 418 about principal proxy rays 417 and 419, respectively. We refer to these rays 18 and 418 as the proxy rays generated by the optical proxy, while principal proxy rays 417 and 419 are also proxy rays, but are useful references, in that they are the rays that would result from a specular reflection from the associated optical proxy, so we refer to them as the principal proxy rays. Diffuser 28 preferably performs similarly but its proxy rays are omitted for clarity.

Diffusers 24 and 26 are both illuminated by parallel incident rays 12, such as from the sun. Diffuser 24 is shown reflecting a principal proxy ray 417 and additional diffused proxy rays 18, while diffuser 26 is shown reflecting a principal proxy ray 419 and additional diffused proxy rays 418. Rays 417 and 419 nominally have different directions, implementing the principle that the optical proxies 24 and 26 comprise a compound optical proxy, producing unique optical information relative to each other. In many embodiments, there is preferably an angular offset 453 between principal proxy ray 419 and the chief reflected ray 17. Offset 453 is specified by the design of the optical proxy 26 and therefore is a known value. The design may comprise both the optical element (a diffuser in this case) and its mounting. Similar angular offset information is known with respect to proxies 24 and 28 but is not shown for clarity.

Imaging subsystem 11 captures optical information generated by the elements 24, 26, and 28. This is accomplished by observing properties of the proxy rays 417, 419, 18 and 418 to the extent these reach the imaging subsystem 11. In some modes of practice, these properties comprise the intensity of the proxy rays.

Some proxy rays from each optical proxy 24, 26, and 28 preferably reach the imaging subsystem 11. Referring to FIG. 3, one of the proxy rays 18 from proxy 24 reaches the imaging subsystem 11 along path 41, while one of the proxy rays 418 reaches the imaging subsystem 11 along path 43.

Optical proxy 26 is designed so that the observed properties of the diffused proxy rays (e.g. rays 418) are a function of their angular separation from the principal proxy ray (e.g. ray 419). Thus, imaging subsystem 11 can infer this angular separation by observing the properties of the proxy ray that reaches it by traveling along path 43. In the figure, path 43 is shown as separated from principal proxy ray 419 by an angle 45. Thus, the observed property (for example, intensity) of that ray encodes the value of angle 45.

Since angle 45 is known by observation and angle 453 is known by design, the imaging system 11 can gain partial knowledge of the value of the direction of ray 17 by sensing proxy 26. Analogous partial information is gained by sensing proxies 24 and 28. Cumulatively, the knowledge obtained from proxies 24, 26, and 28 provides complete knowledge of the direction of ray 17. If the direction of ray 17 is not properly aimed at focus area 7, reflective element 25 can be articulated in a manner effective to correct the aim.

In this mode of practice, the control system and imaging subsystem 11 use intensity characteristics to measure and control aim. In addition to or as an alternative to intensity characteristics, other kinds of optical information may correlate to the manner in which element 25 is aimed, and therefore may be used to measure and control aim as well. For example, in some embodiments, imaging subsystem 11 may be a phase-sensing system that senses time of flight of the optical proxy beams generated by the optical proxy elements 24, 26, and 28.

While FIGS. 1-3 show a single imaging subsystem 11 imaging an array of light redirecting elements (the plurality of heliostats 9), the present invention also includes embodiments wherein multiple imaging subsystems image multiple arrays of light redirecting elements, helping the system to be extensible to arbitrary size.

In some preferred embodiments, imaging subsystem 11 comprises a plurality of individual imaging devices. By way of example, some imaging devices may be provided that image interior regions of the heliostat array 9, while other imaging devices, alternatively with different apertures and focusing optics, may be provided to image more remote regions of the heliostat array 9.

In preferred embodiments, a plurality of imaging devices or imaging subsystems is provided sufficient to provide redundant imagery of the entire heliostat array, helping to provide for reliable operation even if an individual imaging device or imaging subsystem experiences a failure.

Figure 4:
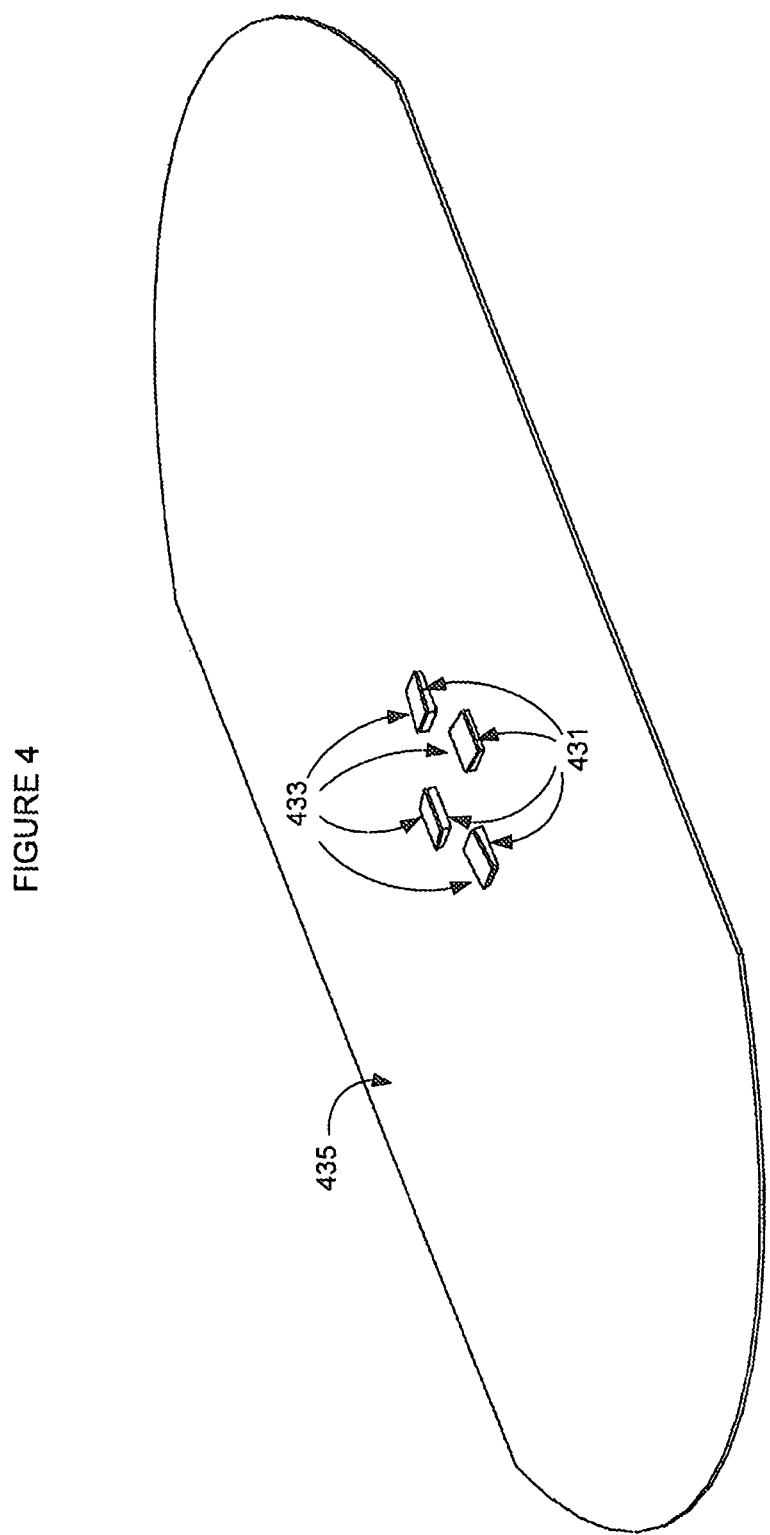
FIG. 4 is an exemplary view of a compound optical proxy comprising multiple optical proxy elements, wherein each element comprises a diffuser mounted on a differently oriented wedge on the surface of a reflector in a manner such that each proxy element generates optical information that correlates, to the aim of the reflector (and hence the direction of light reflected from the reflector) in a way that is unique relative to the other elements, and wherein the cumulative unique optical information allows light reflected from the reflector to be controllably aimed at a desired target.

In some embodiments, the individual optical elements that comprise the individual proxies within a compound optical proxy may be substantially identical but are mounted differently so each produces unique optical information that correlates to the manner in which element 25 is aimed. FIGS. 4-6 illustrate this. One preferred embodiment, shown in FIG. 4, provides optical proxies that include diffusers 433 mounted on wedges 431. The diffusers 433 and 431 in turn are mounted onto reflective element 435. The diffusers 433 and wedges 431 are the same, but each diffuser/wedge pair is mounted differently so the diffusers 433 are tilted at various angles relative to reflecting element 435 to provide unique optical responses.

FIGS. 5 and 6 illustrate how the intensity profiles of diffusers 433 are a function of mounting angle relative to reflective element 435. FIGS. 5 and 6 plot intensity versus angle of the beam coming off the diffusers 433. Because the diffusers 433 are the same and disregarding the angle at which each diffuser 433 is mounted relative to the associated reflective element, the diffusers 433 each provide a substantially identical, radially symmetric diffusion intensity profile such as intensity profile 421 in FIG. 5. Profile 421 shows the intensity of diffused rays from the associated diffuser 433 as a function of angular separation from the corresponding chief proxy ray. The peak intensity corresponds to the chief proxy ray associated with the proxy.

FIG. 6 shows how the angle at which a diffuser 433 is mounted on a wedge 431 causes the intensity profile 423 of a diffuser 433 to shift relative to profile 421 of FIG. 5. Although the shapes of profiles 421 and 423 are the same, the differences in the angle of mounts 431 help to provide distinct shifting of diffusion intensity profiles due to these mounting differences, as shown by the manner in which profile 423 of FIG. 6 is shifted relative to profile 421 of FIG. 5 as seen relative to the chief reflected ray from the associated reflector. The shift in the peaks between FIGS. 5 and 6 represents a change in the angle of the reflected light, such as angle 453 in FIG. 3.

The shift in the intensity profile in FIG. 6 is twice the angle introduced by the wedge 431 on which the associated diffuser 433 is mounted. FIG. 6 thus shows how the wedge 431 creates an offset between the chief reflected ray of the reflector and the chief proxy ray of the optical proxy element, e.g., diffuser 433. This offset is different for each of the optical proxy elements, resulting in the generation of unique optical information by each proxy element.

One skilled in the art will appreciate that in other preferred embodiments, the individual diffusers may comprise so-called "engineered diffusers", which may be selected to provide asymmetric diffusion intensity profiles. By way of example, asymmetric engineered diffusers can be provided that approximate the intensity profile 23 of diffusers 433 on wedges 431, even though each engineered diffuser may be mounted flush with the surface of an associated reflecting element.

One skilled in the art will appreciate that in addition to these kinds of asymmetric diffuser intensity profiles, other profiles are also possible and useful. We have just noted that such a profile can help eliminate the need to mount the diffusers on a wedge, allowing them to be flush with the mirror. This helps to make it easier to clean the mirror, for example. It might also enable easy integration of the optical proxy into the back surface of the mirror, where it will be protected from the elements.

Figure 7C:
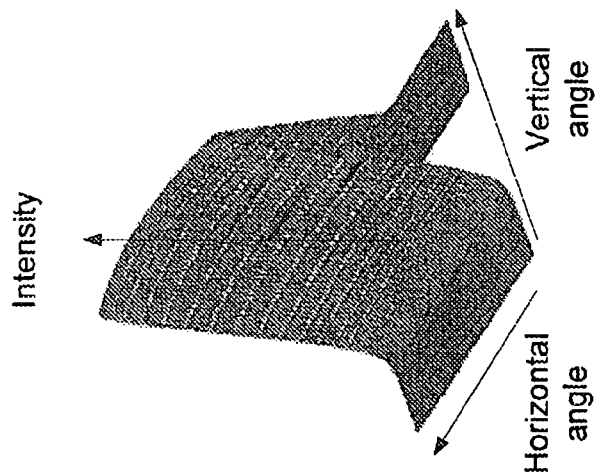
FIGS. 7A-7C illustrate intensity profiles that are substantially one-dimensional that may be incorporated into optical proxies suitable in the practice of the present invention.
Figure 7B:
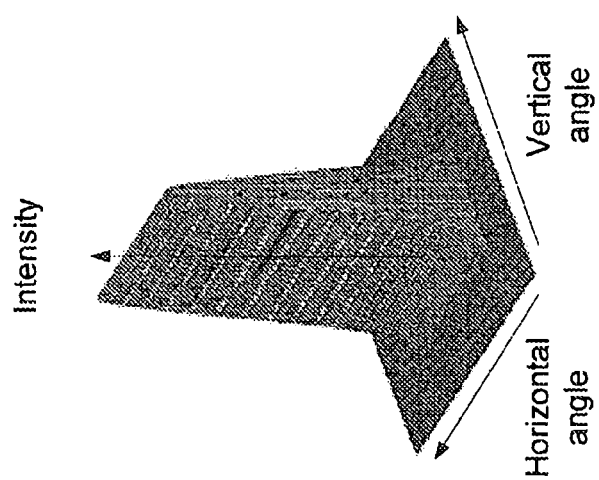
Figure 7A:
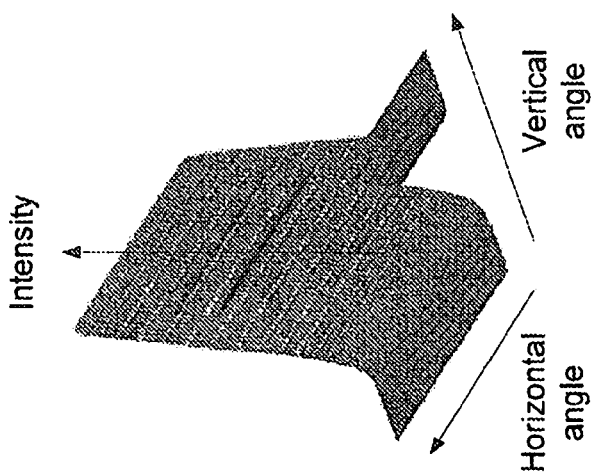

One particularly useful asymmetric diffuser intensity profile is one that is substantially constant in one direction, while providing an intensity gradient in another, e.g., the orthogonal direction, as illustrated in FIG. 7A. The diffuser shown in FIG. 7A has the property that it will vary in brightness as the mirror tips vertically, but very little or not at all as it tips horizontally. A pair of such diffusers mounted orthogonally to each other allows the imaging subsystem to independently measure vertical and horizontal tilts with high resolution. In preferred embodiments, a pair of horizontal diffusers and a pair of vertical diffusers would be provided (mounted with a tilt), so as to be able to uniquely determine the aim of the associated reflector from a single observation.

In other preferred embodiments, diffuser elements have an asymmetric intensity profile that is substantially constant in one direction over only a portion of the field. By way of example, one useful asymmetric diffuser intensity profile implements a "boxcar" in one direction while implementing an intensity gradient in the other, as shown in FIG. 7B. This performs similarly to the intensity profile of FIG. 7A except that this profile has the additional advantage of being brighter. That is, since it scatters light less broadly in the horizontal direction, the light that it does scatter can be brighter, thus helping to provide an improved signal-to-noise ratio at the imaging subsystem. The profile of FIG. 7B has the disadvantage that the diffuser is not visible at extreme horizontal angles, but this is acceptable in many useful systems.

Alternative embodiments of diffuser elements have intensity profiles that may provide weak gradients in one direction rather than just being substantially constant. For example, there are a number of off-the-shelf diffuser products that implement highly asymmetric elliptical intensity profiles, such as a 40×2 degree ellipse, as shown in FIG. 7C. In some instances, these could perform similarly to profiles of FIG. 7B but may be easier to fabricate.

Alternative embodiments of the present invention may implement these approaches using optical proxies other than diffusers. Other kinds of optical proxies include one or more of diffractive elements, polarizers, axicons, positional optical proxies, or any other desirable element that offers measurable profiles of any desirable optical property that correlates to the orientation of the surface to which the proxy is associated. These proxies may be substantially identical proxies and be mounted on wedges, and/or they may provide asymmetric profiles and be mounted flat, and/or they may provide substantially one-dimensional profiles, or any convenient profile in any convenient mounting approach. Examples of optical proxy elements that may be incorporated into a compound optical proxy according to the principles of the present invention are positional optical proxies, such as described in U.S. Provisional Application Nos. 61/562,962, 61/465,165, and/or 61/666,827.

Referring again to system 3 of FIGS. 1-3, imaging subsystem 11 preferably detects an appropriate optical property of each optical proxy 24, 26, and 28 on reflecting element 25, such as detecting the intensity of diffuser proxies. Analogous to the techniques taught in applicant's co-pending applications referred to above, the measured optical properties of the optical proxies on reflecting element 25 can be used to deterministically deduce the direction of the reflected beam 17 of reflecting element 25. In the practice of the present invention however, the optical proxies associated with a particular reflecting element 25 cumulatively generate sufficient, independent optical information so that optical information captured in a single observation of each individual proxy element is sufficient for the direction of beam 17 to be determined. A single observation may be made from substantially the same perspective multiple times in order to improve the quality of the observed information, e.g., capturing the same observation multiple times can improve the signal-to-noise ratio of the resulting estimate of the direction of beam 17.

The ability to determine the direction of beam 17 with a single observation of each individual proxy element is preferred in many systems, since this set of single observations may be made simultaneously by a single imaging subsystem 11. This approach helps to eliminate the need for a potentially large optomechanical structure in the vicinity of focus 7. Such a structure is shown in FIG. 2B of previously referenced U.S. provisional application No. 61/590,278. In some embodiments, such a structure is preferably tens of meters in diameter to create sufficient spatial separation among imaging devices for establishing effective perspective differences. Consequently, some systems may prefer to use a single imaging subsystem according to the teachings of the present invention.

Figure 8:
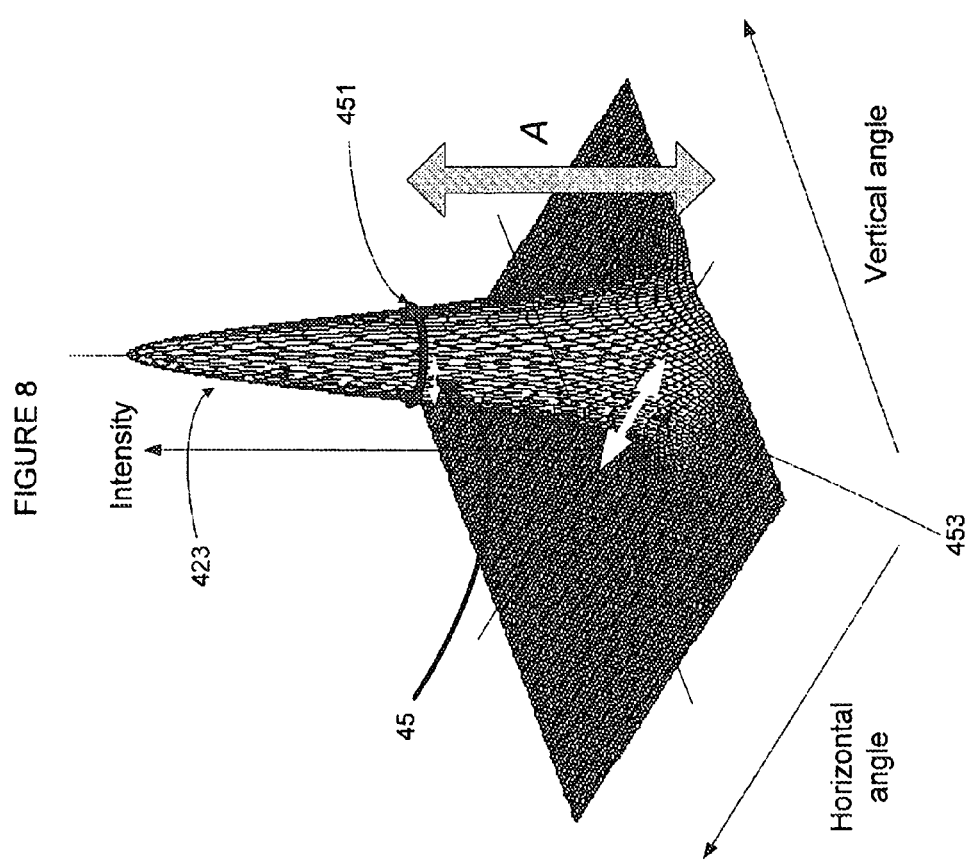
FIG. 8 illustrates an angular constraint provided by the measurement of the intensity of an optical proxy element as sensed by an imaging sensor.

By way of example, in the cases of using proxies comprising radially symmetric optical diffusers that generate a radially symmetric intensity profile such as profile 421 or 423 of FIGS. 5 and 6, the manner in which the present invention may accurately determine the direction of a reflected ray will now be described. The associated imaging subsystem captures and Measures the intensities of the light it sees from each diffuser. Referring to FIG. 8, if the intensity profile of an optical proxy as a function of angle is as illustrated by profile 423, and then further if the intensity of the diffuser as measured by the imaging subsystem is A, then this means that the imaging subsystem is observing a diffused ray (for example, one of the rays 18 of FIG. 3) whose angular offset from its principal ray (e.g., such as ray 419 of FIG. 3) is constrained to be somewhere on circle 451. That is, the angular offset correlates to the intensity of the sensed, diffused light.

In the meantime, recall from the discussion of FIG. 3 above that there is further a known angular offset (such as offset 453) between the principal proxy ray (such as ray 419) associated with that proxy element and the chief reflected ray (such as reflected beam 17) reflected from element 25. Taken together, circle 451 and the known angular offset 453 constrain the chief reflected ray to intersect a circle of a known diameter about the line of sight vector from the diffuser to the imaging subsystem.

If the imaging subsystem can see three diffusers from a given reflector element, the resulting three circular constraints intersect at a single point and thereby completely define the point through which the reflected beam must pass.

Figure 9:
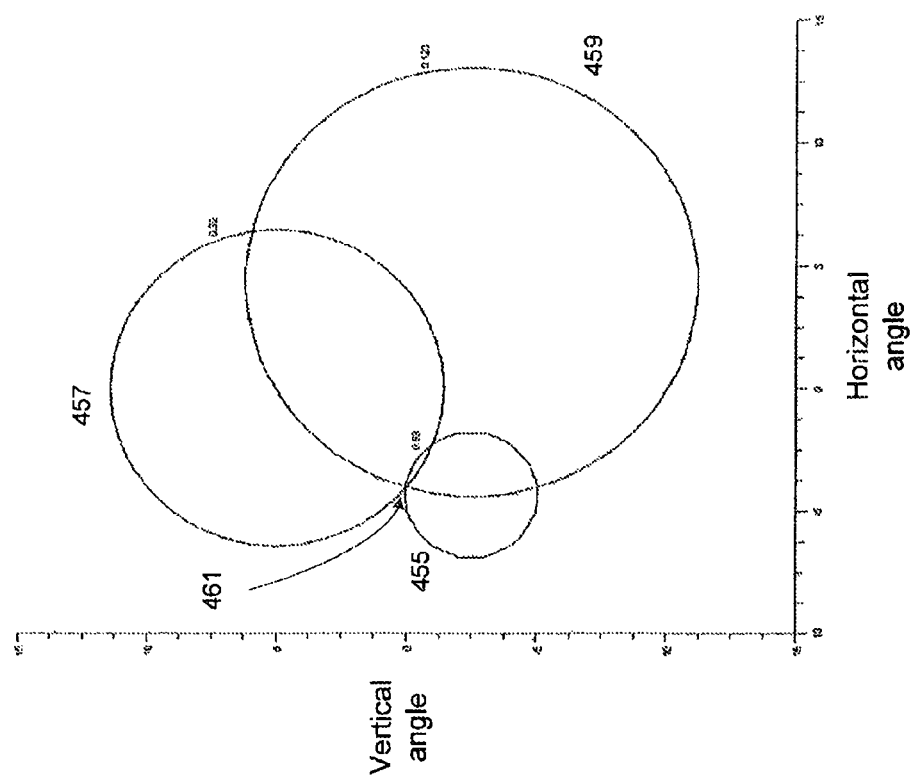
FIG. 9 illustrates how the constraints provided by three unique optical proxies are sufficient to determine the direction of a reflected beam so that feedback control can be used to aim the reflected beam at a desired target.

This is illustrated in FIG. 9. Via application of the geometrical constraints we have just discussed, unique optical information from each of the three diffusers defines circles 455, 457, and 459 through which the reflected beam must pass. The resulting point 461, where the three circles intersect, defines the direction of the reflected beam 17. FIG. 9 shows a case in which the control system has determined that the reflected beam 17 is offset by 4 degrees in the horizontal axis and zero degrees in the vertical axis. This indicates that the offset in the horizontal axis needs to be corrected by 4 degrees so that the chief reflected ray is properly aimed at the focus area 7.

These principles can be applied to FIG. 3. The imaging subsystem 11 observes an intensity A for the particular ray 418 that travels along path 43. Knowing the intensity A constrains ray 418 to be one of the rays represented by locus 451 in the figure. Angle 45 is thus known, as is the radius of ring 451. The control system therefore knows that ray 419 must lie on the surface of a cone surrounding path 43, with a cone half-angle equal to angle 45. Then, since angle 453 is known, ray 17 is likewise constrained. This information alone is not sufficient to determine which ray 418 is being observed by imaging system 11, but the ray must lie on a circle of radius 45. By making analogous observations of the other two proxies, the control system can uniquely infer the direction of chief reflected ray 17.

In many embodiments involving diffusers 24, 26, and 28 according to FIGS. 1-3, the angle of the reflected beam 17 is not adequately constrained to a particular locus of positions by a single intensity measurement from a single diffuser, since the intensity of the illuminating ray 12 (See FIG. 2B) is not known. One skilled in the art will appreciate that by combining measurements from a plurality of diffusers, this ambiguity can be resolved. For example, in the case of radially symmetric diffusers, there are any number of circles that the reflected beam 17 could intersect depending on the intensity of ray 12, with the diameter of the constraining circle being a function of the intensity of ray 12.

However, taken in combination with a similar constraint from the other diffusers, one can appreciate that the constraints from the diffusers, taken together, describe a family of circles whose diameters are all deterministic functions of the intensity of ray 12. In practical effect, by using independent, unique optical information from a plurality of diffusers, the ambiguity associated with a single diffuser can be resolved. In contrast, if the intensity of ray 12 is known, then two diffusers may provide sufficient information to determine the direction of reflected beam 17, and three diffusers allow unique determination of the beam direction from a single image. Four diffusers, however, provide sufficient information to determine not only the direction of reflected beam 17 but also the intensity of ray 12. One skilled in the art will appreciate that the problem is likewise solvable when the light ray. 12 is not just a single ray, but is a bundle of rays incident from a variety of angles (such as from the disk of the sun).

Any desirable combination of optical proxies and algorithms may be used that permits the unique determination of the direction of the chief reflected ray 17. By way of example, in a particularly preferred embodiment, four 1-D diffusers, such as the type shown in FIG. 7, may be provided to sense two orthogonal axes, helping to simplify the algorithms required.

One may appreciate that when there is a compound optical proxy comprising multiple individual optical proxies present on a single light redirecting element, each individual proxy responds differently as the light redirecting element 25 articulates. By way of example, the intensity of diffuser proxies 24, 26, and 28 will vary uniquely so that each diffuser's intensity varies differently as a function of how element 25 is aimed.

According to another mode of practice for using optical information from the unique and independent diffusers, one can consider the overall intensity pattern produced by the set of diffusers taken together. Optical information can be used to determine information indicative of the cumulative optical pattern, and then this determined information can be used to aim the redirected light onto a target. For example, as the light redirecting element 25 articulates, the brightness of the diffusers incorporated into proxies 24, 26, and 28 will each uniquely change. The overall intensity pattern also will change in a way that correlates to the aim of the element 25. The present invention appreciates that an optical characteristic of the pattern, such as the centroid of that intensity pattern and/or other derived metric, will move or otherwise vary in a manner that correlates to the aim of element 25. Consequently, for convenient arrangements of optical proxies and selection of optical proxy profiles, there is a one-to-one mapping between the centroid location and the direction of the chief reflected ray 17. This means that the centroid of the diffusion intensity information can be determined and used to help control the aim of element 25.

In some embodiments, the imaging subsystem 11 thus captures optical information from optical proxy elements 24, 26, and 28 and then uses that information to determine the location of that centroid of intensity. The location of the centroid is used to infer the direction of the chief reflected ray 17. In preferred embodiments, optical proxies and profiles may be provided such that the measured coordinates of the centroid of the intensity pattern are orthogonally and monotonically related to the direction of the reflected beam 17. For example, the x and y coordinates of the centroid in the field of view of the imaging subsystem 11 may be linearly related to the elevation and azimuth angles of the reflected ray 17.

Figure 10:
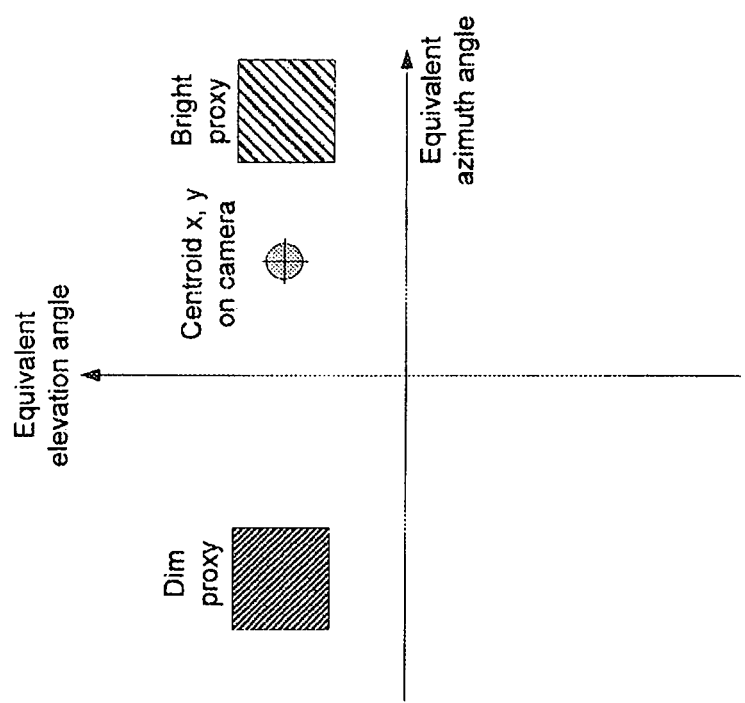
FIG. 10 illustrates how a compound optical proxy can produce an intensity pattern whose intensity centroid encodes the direction of the reflected beam.

One embodiment of this principle is illustrated in FIG. 10. The embodiment shows the image, as seen by the imaging subsystem 11, of two proxies whose intensities are designed to vary with azimuth angle. Each proxy responds differently to azimuth angle. One simple embodiment would be a pair of diffusers of the type shown in FIG. 7A, mounted at opposite tilt angles.

The two proxies of FIG. 10 will have intensities that vary uniquely as the aim of the associated reflecting element changes. Rather than processing the two proxies independently and using the technique of FIG. 9 to determine the aim of ray 17, the imaging subsystem can instead perform a centroid operation on the pixels of the two diffusers. In the figure, since the proxy on the right is brighter, the centroid will be nearer to it.

In this way, intensity variation in the diffusers is encoded simply into motion of the centroid on the detector of the imaging subsystem. One skilled in the art will appreciate that many desirable encodings are possible, including a linear encoding. Thus, through a centroiding operation, the imaging subsystem can convert a complex intensity geometric problem into a simple linear encoding. That is, with an appropriate set of proxy elements, for example, four proxy elements of the type shown in FIG. 7A mounted at appropriate tilts, a compound proxy may be comprised such that the angle offset of ray 17 from desired path 19 can be measured directly as the x-y position of the centroid on the detector.

One skilled in the art will appreciate that the performance of an optical proxy may vary depending on its distance from the imaging subsystem 11. The further the optical proxy is from the imaging subsystem 11, the less bright it will be. This means that the accuracy with which the proxy encodes the angular orientation of its light redirecting element 25 may vary with distance.

Some preferred embodiments provide optical proxies that help to mitigate the impact of distance upon encoding accuracy. For example, one useful type of optical diffuser is one whose encoding of angle, expressed as percent change in intensity as a function of change in angle, remains substantially constant, or varies as little as practically feasible, regardless of distance.

Expressed mathematically, one desirable function for intensity I(x) is thus $$I(x)=Ae^{-C|x|}$$

Where x is the distance from the proxy chief ray, and A and C are arbitrary constants chosen by the proxy designer. This function has the property that the function is proportional to its own derivative, which yields the desired property that percentage change in the output, expressed as $\Delta I(x)/\Delta x$, is constant.

In some embodiments, it is useful to think about the angle θ being encoded, in which case a change of variable x=tan (θ) yields a function $$I(\theta)=Ae^{-C|tan\ \theta|}$$

This has similar properties, with the advantage that the intensity drops to zero at angles of 90 degrees, as we would typically want in a real diffuser.

These functions, or any other useful function, may be provided in a diffuser or any other optical proxy, including but not limited to providing an optical proxy that is an engineered diffuser that implements one of these profiles.

One skilled in the art will realize that other embodiments may choose from an abundance of encoding strategies that may implement other useful profiles. For example, while the aforementioned functions implement a diffuser whose sensitivity is constant with distance, some preferred embodiments implement alternative functions whose sensitivity increases with distance. Other embodiments may be more concerned with the absolute brightness of the diffuser, which can help the optical information to be easily detected by the imaging system. In these embodiments, the diffuser may be optimized less for uniform sensitivity and more for detectability at a distance, leading to a different diffuser profile.

The one-dimensional, "boxcar" diffuser profile of FIG. 7B is a particularly useful embodiment of an optical proxy when used in groups of four. Two proxies can be arranged so as to uniquely encode angle in one axis, while the other two uniquely encode angle in the other axis. Advantageously as well, the boxcar function in the non-diffusing axis means that the light that is diffused by the diffuser is generally diffused in useful directions. Light is not sent far afield in the non-sensing axis, where it is unlikely to ever be needed.

Carrying this further, some embodiments desirably narrow the width of the boxcar in the non-sensing axis (the horizontal axis in FIG. 7B) further so as to further concentrate the diffused light into a useful region. This helps to make it easier for an imaging subsystem to detect the light from the corresponding diffuser.

However, if the boxcar is made overly narrow in the non-sensing axis, the diffuser will only be visible if the reflector is aimed accurately in the non-sensing direction, which may make it difficult to sense the reflector's aim.

Some embodiments of compound proxies therefore incorporate both narrow-angle and wide-angle optical proxy elements. A wide-angle proxy element is provided in order to allow coarse positioning (for example, positioning to within 1-2 degrees accuracy), and a brighter, more precise narrow-angle proxy element is also provided that is easily detectable and permits fine positioning.

In some embodiments, the wide-angle proxy is a single radially symmetric two-dimensional Gaussian diffuser centered on the line of sight (i.e., with no offset wedge), with an intensity profile as shown in FIG. 5. In these embodiments, one approach to initial acquisition is to move the light redirecting element 25 in both axes, observing the intensity of the wide-angle proxy element, and homing in on the peak intensity. Once that has been done, tracking can begin based on optical information provided by the narrow-angle compound proxy.

Figure 11:
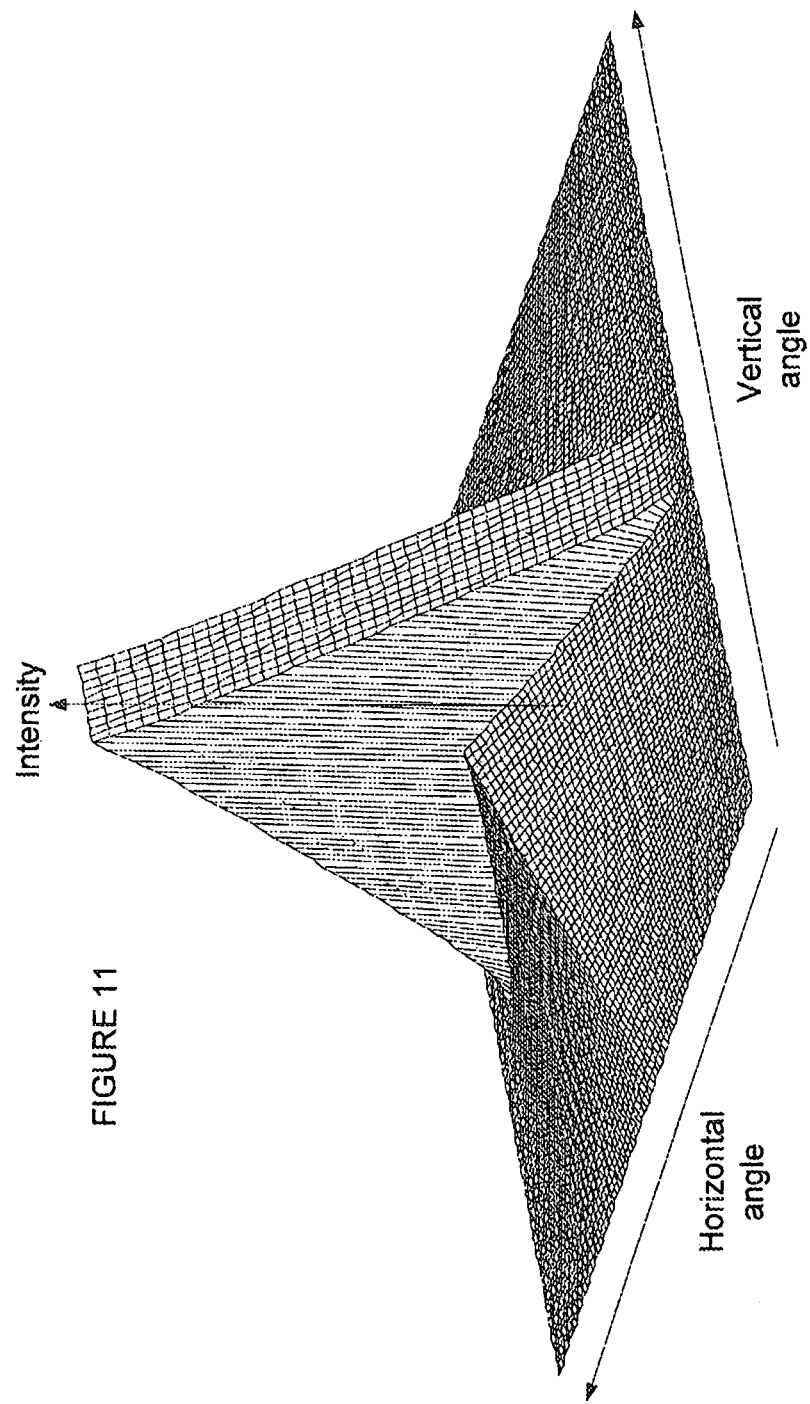
FIG. 11 illustrates the intensity profile for one embodiment of an engineered diffuser that combines wide angle detectability with excellent one-dimensional sensitivity.

One preferred embodiment combines a wide-angle proxy element and a narrow-angle proxy element into a single engineered diffuser whose optical profile is shown in FIG. 11. FIG. 11 shows a profile corresponding to a one-dimensional diffuser implementing an $e^{-|tan\,\theta|}$ profile in the horizontal direction, combined with a narrow boxcar in the vertical direction. High sensitivity is provided within the narrow boxcar region. Then, to help enable a wide detection angle in the vertical direction, outside the boxcar, a linear decay is provided out to wide angles.

In many embodiments, such as the one presented in FIG. 4, the optical proxy elements are mounted on the front of the mirror.

Using various techniques such as described in Applicants' co-pending applications cited herein, optical proxy elements may be integrated directly, into a reflecting element such as reflecting element 25. The present invention additionally teaches that the optical proxy elements can also be mounted behind a reflecting element in a manner such that the elements are still viewable from the front side. This may be accomplished in various ways such as by providing a hole in the mirror or by providing a window in the mirror where there is no mirror coating. This helps to protect the proxy elements and promotes the generation of more consistent and accurate optical information over long periods of service life. It also provides a simple mechanical interface that is nonetheless very accurate. For example, FIGS. 12A and 12B show an embodiment of a light redirecting element 200 having a light redirecting front face 202 and a backside 204. Optical proxy elements 206, 208 and 210 are mounted to the backside 204. In many embodiments, the light redirecting element 200 is a back surface reflector, meaning that backside 204 comprises a surface covered with a silvered coating and protective paint, or other useful materials. Light redirecting element 200 has windows 212 so that each proxy element 206, 208, and 210 are viewable from front face 202. In some embodiments, a single window (not shown) may allow viewing of the proxy elements 206, 208, and 210. In some embodiments, windows may comprise gaps in the coating(s) on the backside 204 of the redirecting element. In other embodiments, the windows may comprise physical holes in element 200.

Although FIGS. 5-10 illustrate proxies that encode optical properties as a function of particular angles, such as horizontal and vertical angles, one skilled in the art will appreciate that useful optical proxies may encode any convenient set of angles, and that a compound optical proxy may comprise individual proxy elements that encode angles that are different from each other.

All patents, patent applications, and publications cited herein are incorporated by reference as if individually incorporated. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of redirecting incident light, comprising the steps of:
    (a) using at least one light redirecting element to redirect the incident light;
    (b) providing a compound optical proxy comprising a plurality of optical proxies that are associated with a corresponding light redirecting element in a manner such that at least two of the optical proxies distribute a portion of the incident light uniquely relative to each other, wherein optical information encoded in the light distributed by the optical proxies cumulatively correlates to the aim of the light redirecting element;
    (c) observing the optical information distributed by the optical proxies; and
    (d) using the optical information to controllably actuate the corresponding light redirecting element in a manner that aims the redirected light onto a target.

2. The method of claim 1, wherein step (a) comprises using a plurality of light redirecting elements, each light redirecting element being controllably articulated to redirect light onto the target.

3. The method of claim 1, wherein an optical proxy of the plurality of optical proxies is integral with the light redirecting element and is viewable from a front side surface of the light redirecting element.

4. The method of claim 1, wherein the light redirecting element comprises a window and wherein an optical proxy of the plurality of optical proxies is coupled to the light redirecting element and is viewable through the window.

5. The method of claim 1, wherein an optical proxy of the plurality of optical proxies comprises light diffusing functionality.

6. The method of claim 1, wherein step (c) comprises using an imaging subsystem to observe the optical information distributed by the optical proxies in a single observation to capture the optical information distributed by the optical proxies; and wherein step (d) comprises using the optical information from a single observation to controllably actuate the corresponding light redirecting element in a manner that aims the redirected light onto the target.

7. The method of claim 6, wherein step (c) comprises observing the optical information distributed by the optical proxies, the optical information including an intensity of diffused light produced by the optical proxies.

8. The method of claim 1, wherein step (d) comprises using a closed loop control system to controllably articulate the light redirecting element.

9. The method of claim 1, wherein step (c) comprises observing the optical information distributed by the optical proxies a plurality of times from a single perspective.

10. The method of claim 1, wherein step (c) comprises observing the optical information distributed by the optical proxies from a plurality of perspectives.

11. The method of claim 1, wherein the at least two optical proxies of the plurality of optical proxies are mounted on the light redirecting element at different angles relative to each other.

12. The method of claim 1, wherein an optical proxy of the plurality of optical proxies has a radially symmetric intensity profile.

13. The method of claim 1, wherein an optical proxy of the plurality of optical proxies has an asymmetric intensity profile.

14. The method of claim 1, wherein an optical proxy of the plurality of optical proxies has an intensity profile that is substantially constant in one direction and that provides an intensity gradient in a second direction.

15. The method of claim 1, wherein an optical proxy of the plurality of optical proxies has a boxcar intensity profile.

16. The method of claim 1, wherein an optical proxy of the plurality of optical proxies comprises a light diffusing element mounted on a wedge.

17. The method of claim 1, wherein step (d) further comprises using the optical information to determine information indicative of angular offsets of proxy rays produced by the optical proxies.

18. The method of claim 1, wherein the optical information encoded in the light distributed by the optical proxies cumulatively provides an optical pattern, and wherein step (d) further comprises using the optical information to determine information indicative of a characteristic of the optical pattern provided by the optical information, and using said determined information to aim the redirected light onto the target.

19. The method of claim 18, wherein the characteristic is a centroid of the optical pattern.

20. The method of claim 1, wherein an optical proxy of the plurality of optical proxies has an intensity function having a derivative, wherein the intensity profile is proportional to the derivative.

21. The method of claim 1, wherein an optical proxy of the plurality of optical proxies has an intensity function wherein intensity varies as a function of an angle encoded in the intensity function, and wherein the intensity function is substantially 0 for an angle of 90 degrees.

22. A system for concentrating sunlight onto a centralized target, comprising:
(a) a centralized target;
(b) a plurality of heliostats, each heliostat comprising:
(i) a light redirecting element that redirects incident light; and
(ii) a plurality of optical proxies that are associated with the light redirecting element in a manner such that at least two optical proxies of the plurality of optical proxies distribute a portion of the incident light uniquely relative to each other, wherein optical information encoded in the light distributed by the at least two optical proxies cumulatively correlates to the aim of the light redirecting element;
(c) a device that observes the optical information distributed by the at least two optical proxies; and
(d) a control system that uses the optical information in a manner effective to aim the redirected light onto the centralized target.

23. A method of redirecting incident light, comprising the steps of:
(a) using at least one light redirecting element to redirect the incident light;
(b) providing a compound optical proxy comprising a plurality of optical proxies that are associated with the light redirecting element in a manner such that at least two optical proxies of the plurality of optical proxies distribute a portion of the incident light uniquely relative to each other as observed in a single observation of each unique optical proxy, wherein optical information encoded in the light distributed by the at least two optical proxies cumulatively correlates to the aim of the light redirecting element;
(c) observing the distributed portion of the incident light in a single observation to sense the optical information of the distributed portion of the incident light; and
(d) using the optical information to controllably actuate the light redirecting element in a manner that aims the redirected light onto a target.

24. The method of claim 23, wherein the light redirecting element has a reflecting front side surface and an optical proxy of the plurality of optical proxies is coupled to the reflecting front side surface.

25. The method of claim 23, wherein an optical proxy of the plurality of optical proxies is integral with the light redirecting element and the optical proxy is viewable from a front side surface of the light redirecting element.

26. The method of claim 23, wherein the light redirecting element comprises a window and wherein an optical proxy of the plurality of optical proxies is coupled to the light redirecting element and is viewable through the window.

27. The method of claim 23, wherein step (c) comprises using an imaging subsystem to observe the distributed portion of the incident light in a single observation to capture the optical information from the distributed portion of the incident light; and wherein step (d) comprises using the optical information from a single observation to controllably actuate the light redirecting element in a manner that aims the redirected light onto the target.

28. The method of claim 27, wherein step (c) comprises observing the distributed portion of the incident light including the optical information encoded in the light distributed by the at least two optical proxies, the optical information including an intensity of diffused light produced by the at least two optical proxies.

29. The method of claim 23, wherein step (d) comprises using a closed loop control system to controllably articulate the light redirecting element.

30. The method of claim 23, wherein step (c) comprises observing the distributed portion of the incident light a plurality of times from a single perspective.

31. The method of claim 23, wherein step (c) comprises observing the distributed portion of the incident light from a plurality of perspectives.

32. The method of claim 23, wherein an optical proxy of the plurality of optical proxies has a radially symmetric intensity profile.

33. The method of claim 23, wherein an optical proxy of the plurality of optical proxies has an asymmetric intensity profile.

34. The method of claim 23, wherein an optical proxy of the plurality of optical proxies has an intensity profile that is substantially constant in one direction and that provides an intensity gradient in a second direction.

35. The method of claim 23, wherein an optical proxy of the plurality of optical proxies has a boxcar intensity profile.

36. The method of claim 23, wherein the optical information encoded in the light distributed by the optical proxies cumulatively provides an optical pattern, and wherein step (d) further comprises using the optical information to determine information indicative of a characteristic of the optical pattern provided by the optical information and using said determined information to aim the redirected light onto the target, and wherein the characteristic is a centroid of the optical pattern.

37. The method of claim 23, wherein an optical proxy of the plurality of optical proxies has an intensity function having a derivative, wherein the intensity profile is proportional to the derivative.

38. The method of claim 23, wherein an optical proxy of the plurality of optical proxies has an intensity function wherein intensity varies as a function of an angle encoded in the intensity function and wherein the intensity function is substantially 0 for an angle of 90 degrees.

* * * * *